(12) United States Patent
Mimassi

(10) Patent No.: US 11,941,548 B2
(45) Date of Patent: Mar. 26, 2024

(54) SYSTEM AND METHOD FOR MATCHING PATRONS, SERVERS, AND RESTAURANTS WITHIN THE FOOD SERVICE INDUSTRY

(71) Applicant: RockSpoon, Inc., San Jose, CA (US)

(72) Inventor: Nagib Georges Mimassi, Palo Alto, CA (US)

(73) Assignee: ROCKSPOON, INC., San Jose, CA (US)

( * ) Notice: Subject to any disclaimer, the term of this patent is extended or adjusted under 35 U.S.C. 154(b) by 48 days.

(21) Appl. No.: 17/571,459

(22) Filed: Jan. 8, 2022

(65) Prior Publication Data

US 2022/0122020 A1    Apr. 21, 2022

Related U.S. Application Data

(63) Continuation of application No. 16/950,068, filed on Nov. 17, 2020, now Pat. No. 11,222,297, which is a (Continued)

(51) Int. Cl.
*G06Q 10/02* (2012.01)
*G06F 16/9035* (2019.01)
(Continued)

(52) U.S. Cl.
CPC ......... *G06Q 10/02* (2013.01); *G06F 16/9035* (2019.01); *G06F 18/23* (2023.01);
(Continued)

(58) Field of Classification Search
CPC ....... G06Q 10/06398; G06Q 10/06393; G06Q 10/06395; G06Q 50/12; G06F 16/9035; G06F 18/23; G06N 20/00
See application file for complete search history.

(56) References Cited

U.S. PATENT DOCUMENTS 7,228,351 B2 * 6/2007 Arwe ................. G06F 9/52
                                                        718/104
9,594,854 B1 * 3/2017 Orofino ................ G06F 30/00
(Continued)

FOREIGN PATENT DOCUMENTS

CN         111191804 A  *  5/2020

OTHER PUBLICATIONS

Frei "Breaking the Trade-Off Between Efficiency and Service" (2006) (https://hbr.org/2006/11/breaking-the-trade-off-between-efficiency-and-service) (Year: 2006).*

*Primary Examiner* — Sujay Koneru
(74) *Attorney, Agent, or Firm* — Galvin Patent Law LLC; Brian R. Galvin

(57) ABSTRACT

A system and method of combining table management software and customer experience skills by generating profiles of patrons, servers, and restaurants and using machine learning algorithms on those profiles to build more intimate relationships between patrons, food service establishments, and food service professionals. Trait matching provides optimized matchmaking between patrons and servers who share certain commonalities while also balancing the table management operations. Machine learning algorithms may be used to identify patterns of commonality that would not otherwise be recognized. This system allows patrons to choose servers at an establishment over a plurality of electronic devices by using the cluster analysis results. It provides servers more lateral work experience between participating restaurants, and restaurants more power to operate smoothly and build highly cohesive teams.

12 Claims, 11 Drawing Sheets

Related U.S. Application Data continuation of application No. 17/097,443, filed on Nov. 13, 2020, now Pat. No. 11,257,105, which is a continuation-in-part of application No. 17/091,925, filed on Nov. 6, 2020, now Pat. No. 11,334,866, which is a continuation-in-part of application No. 17/005,038, filed on Aug. 27, 2020, now Pat. No. 11,232,426, which is a continuation-in-part of application No. 16/796,342, filed on Feb. 20, 2020, now Pat. No. 10,803,442.

(60) Provisional application No. 63/073,814, filed on Sep. 2, 2020, provisional application No. 63/070,895, filed on Aug. 27, 2020, provisional application No. 62/964,413, filed on Jan. 22, 2020, provisional application No. 62/938,817, filed on Nov. 21, 2019.

(51) Int. Cl.
*G06F 18/23* (2023.01)
*G06N 20/00* (2019.01)
*G06Q 10/0639* (2023.01)
*G06Q 50/12* (2012.01)

(52) U.S. Cl.
CPC ....... *G06N 20/00* (2019.01); *G06Q 10/06393* (2013.01); *G06Q 10/06395* (2013.01); *G06Q 10/06398* (2013.01); *G06Q 50/12* (2013.01)

(56) References Cited

U.S. PATENT DOCUMENTS

| | | | |
|---|---|---|---|
| 10,290,016 B1 | 5/2019 | Rose | |
| 2004/0143496 A1* | 7/2004 | Saenz | G06Q 30/0224 705/14.66 |
| 2011/0246483 A1* | 10/2011 | Darr | H04L 67/306 707/748 |
| 2013/0138515 A1* | 5/2013 | Taniguchi | G06Q 30/0635 705/15 |
| 2014/0278611 A1* | 9/2014 | Russell | G06Q 50/12 705/5 |
| 2015/0081382 A1 | 3/2015 | L'Heureux et al. | |
| 2015/0120731 A1* | 4/2015 | Nemery | G06F 16/285 707/737 |
| 2015/0379649 A1* | 12/2015 | Sullivan | G06Q 10/063112 705/7.14 |
| 2017/0018184 A1* | 1/2017 | Northrup | H04W 4/02 |
| 2018/0004751 A1* | 1/2018 | Vikhe | G06F 16/248 |
| 2019/0340622 A1* | 11/2019 | Azoulay | G06Q 30/0205 |
| 2020/0081445 A1* | 3/2020 | Stetson | G06F 18/29 |
| 2020/0249660 A1* | 8/2020 | Rao | G05B 19/0428 |
| 2021/0056511 A1* | 2/2021 | Underwood | G06Q 10/1053 |

* cited by examiner

SYSTEM AND METHOD FOR MATCHING PATRONS, SERVERS, AND RESTAURANTS WITHIN THE FOOD SERVICE INDUSTRY

CROSS-REFERENCE TO RELATED APPLICATIONS

Priority is claimed in the application data sheet to the following patents or patent applications, the entire written description of each of which is expressly incorporated herein by reference in its entirety:
Ser. No. 16/950,068
Ser. No. 17/097,443
Ser. No. 17/091,925
Ser. No. 17/005,038
Ser. No. 16/796,342
62/938,817
62/964,413
63/070,895
63/073,814

BACKGROUND

Field of the Art

The disclosure relates to the field of automated customer service systems, and more particularly to the field of customer detection and profiling using wireless-enabled mobile devices.

Discussion of the State of the Art

Modern-day restaurants who are looking to turn a profit need to master both customer experience and table management. While these skills are distinct, they are also inextricable. Current table management software focuses solely on logistics such as floor plans and predicting wait times and is engineered entirely from the restaurant's point of view which leaves the customer experience completely up to the server.

While every restaurant desires a constant stream of regulars, turning one-time patrons into loyal customers requires extended periods of time and retention rate of staff who can then build rapport, both of which are scarce in the fast-paced restaurant industry. The high turnover rate of servers diminishes a restaurant's ability to build these lasting relationships with its customers, whereas professional servers also need to the ability to seek more favorable establishments if their skills are in high demand or in order to reduce burnout.

What is needed is a system and method of combining table management and customer experience by generating profiles of patrons, servers, and restaurants and using machine learning algorithms on those profiles to build more intimate relationships between patrons and food service establishments and professionals.

SUMMARY

Accordingly, the inventor has conceived and reduced to practice, a system and method of combining table management software and customer experience skills by generating profiles of patrons, servers, and restaurants and using machine learning algorithms on those profiles to build more intimate relationships between patrons, food service establishments, and food service professionals. This system gives patrons new choices over their dining experience, servers more lateral movement between participating restaurants, and restaurants more power to operate smoothly and build highly cohesive teams. Trait matching provides optimized matchmaking between patrons and servers who share certain commonalities while also balancing the table management operations. Machine learning algorithms may be used to identify patterns of commonality that would not otherwise be recognized. This system allows patrons to choose servers at an establishment over a plurality of electronic devices by using the cluster analysis results. It provides servers more lateral work experience between participating restaurants, and restaurants more power to operate smoothly and build highly cohesive teams.

According to a preferred embodiment, a system for matching patrons and servers at restaurants is disclosed, comprising: a computing device comprising a memory, a processor, and a data storage device; a database residing in the data storage device, the database comprising profiles of patrons and servers; a profile mapping and recommendation engine comprising a plurality of programming instructions stored in the memory, and operating on the processor, wherein the plurality of programming instructions, when operating on the processor, cause the computing device to: retrieve a patron's profile from the database; retrieve the server profiles from the database; map the patron's profile and the server profiles in a computational graph and use graph analysis algorithms to identify a plurality of servers who are most connected with the patron in the computational graph; and match the patron to one of the servers in the plurality of servers.

According to a second preferred embodiment, a method for matching patrons and servers at restaurants is disclosed, comprising the steps of: retrieving a patron's profile from the database; retrieving the server profiles from the database; mapping the patron's profile and the server profiles in a computational graph and using graph analysis algorithms to identify a plurality of servers who are most connected with the patron in the computational graph; and matching the patron to one of the servers in the plurality of servers.

According to various aspects: wherein the database further comprises information about external factors, and the external factors are also processed through the machine learning algorithm during the matching process; wherein the database further comprises restaurant profiles; wherein an individual server's profile and the restaurant profiles are mapped in a computational graph that is used to identify a plurality of restaurants who are most connected with the individual server; wherein the individual server is matched with a restaurant from the plurality of restaurants; wherein a portion of the information for the patron, server, or restaurant profiles is received from a social media account; and wherein the patron selects a setting on the mobile device, wherein the setting is the purpose of the patron's visit, and the setting is stored in the patron's profile.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 1 a block diagram illustrating an exemplary system architecture for a patron-server matching system.

DETAILED DESCRIPTION

Figure 1:
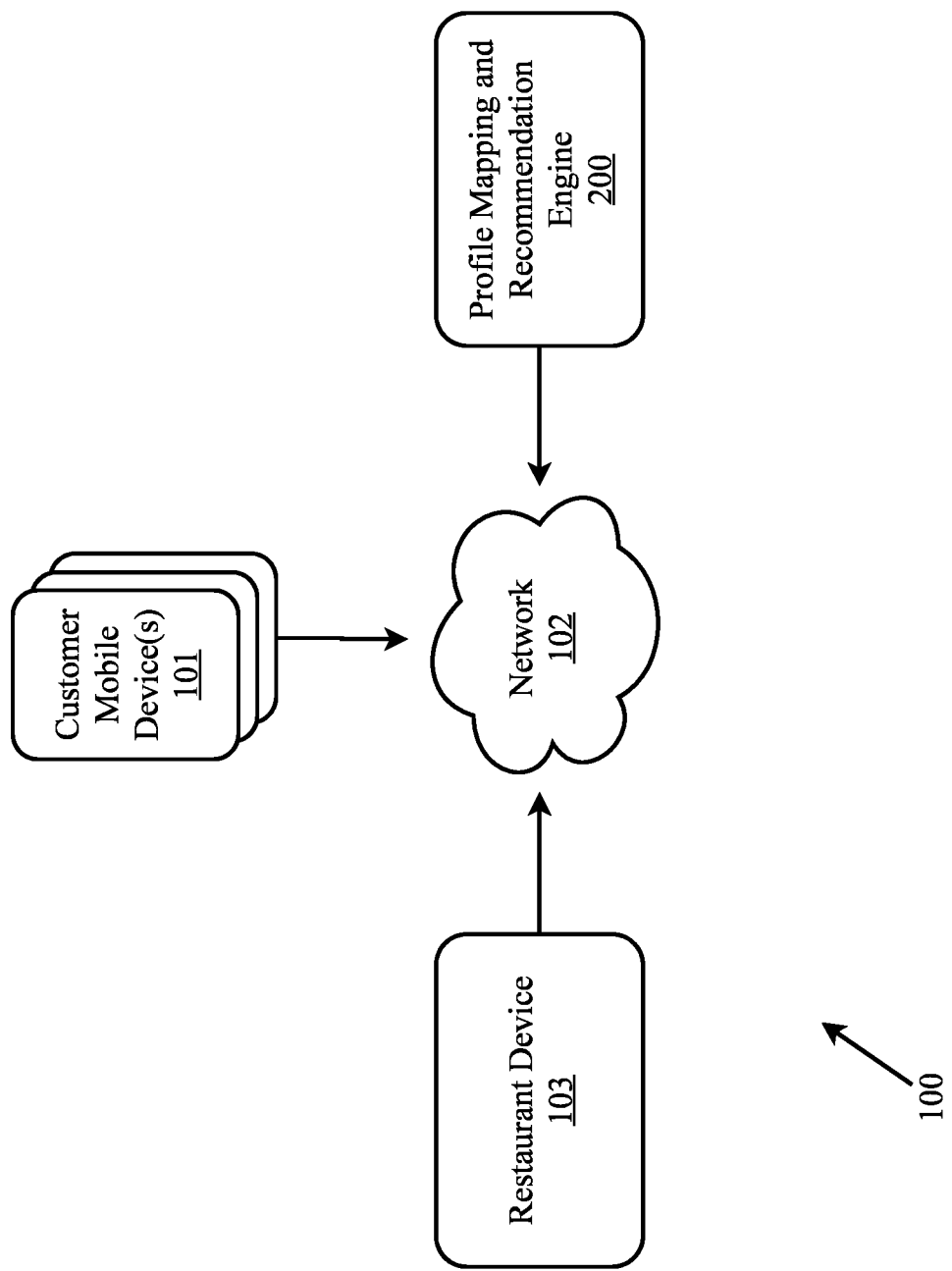

The inventor has conceived, and reduced to practice, a system and method of combining table management software and customer experience skills by generating profiles of patrons, servers, and restaurants and using machine learning algorithms on those profiles to build more intimate relationships between patrons, food service establishments, and food service professionals. This system gives patrons new choices over their dining experience, servers more lateral movement between participating restaurants, and restaurants more power to operate smoothly and build highly cohesive teams. Trait matching provides optimized matchmaking between patrons and servers who share certain commonalities while also balancing the table management operations. Machine learning algorithms may be used to identify patterns of commonality that would not otherwise be recognized. This system allows patrons to choose servers at an establishment over a plurality of electronic devices by using the cluster analysis results. It provides servers more lateral work experience between participating restaurants, and restaurants more power to operate smoothly and build highly cohesive teams.

A profile mapping and recommendation engine, when given enough information about their servers and customers, provides recommendations on which servers may be a good fit with the customer as well as balancing the server to customer ratio. Customers register their mobile devices with a restaurant and when the customer visits, he or she gets automatically matched with a server who shares common traits or that they've ranked highly in the past. They may also choose to try a new server and select a server based on the context of their visit. Other algorithms may be used to match patrons with servers and servers with restaurants.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods, and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Business establishment" or "place of business" as used herein mean the location of any business entity with which customers may transact business. Typically, this will be a physical location where customers may enter the location and transact business directly with employees of the business, but may also be a business without a physical location such as an online or telephone order retailer. Many examples herein use a restaurant as the business establishment, but the invention is not limited to use in restaurants, and is applicable to any business establishment.

The term "network" as used herein means any communication connection between two or more computing devices, whether such connection is made directly (e.g., from one device containing a Bluetooth radio to another device containing a Bluetooth radio) or through an intermediary device such as a router, where a number of devices connected to the router may all communicate with one another.

"Server" or "Waitstaff" as used herein are individuals who work at a restaurant, bar, or other business establishment, attending to customers by supplying them with food and drink as requested. Servers may take on additional roles such as clearing and setting tables, greeting customers, or duties in the kitchen. Where the term "server" is used in the context of computer hardware, it shall have the meaning associated with computer hardware.

Conceptual Architecture

FIG. 1 is a block diagram illustrating an exemplary system architecture 100 for a patron-server matching system. In this embodiment, the patron-server matching system 100 comprises a profile mapping and recommendation engine 200 and a restaurant device 103, which may operate through a network 102 which provides the communication between the components, and may be accessed by one or more customer's mobile device(s) 101. Depending on the embodiment, the recommendation engine may operate on the restaurant device, or on a cloud-based server, or on a customer mobile device, or some combination of these options. For each customer, a profile is created and stored in a profile mapping and recommendation engine 200. A profile mapping and recommendation engine 200 is a computing device that when given a plurality of customer, server, and restaurant information, makes associations and recommendations about matching customers with their ideal servers via machine learning algorithms. A restaurant device 103 is typically a mobile computing device that connects to a restaurant's network 102 that may be used by servers as a point-of-sale or table management device, or it may be used by patrons for entertainment or ordering services. According to this embodiment, an additional aspect of the restaurant device 103 is to allow patrons to rate servers, save context templates (see FIG. 3B), manually select servers, or have the profile mapping and recommendation engine 200 choose a server automatically.

In a typical scenario, unique identification numbers from the customer's mobile device 101 are associated with a customer's profile where the customer's profile comprises information such as the customer's name and email address. A plurality of methods may be utilized for registering first time customers. Front desk waitstaff may create a profile on the customer's behalf. The customer could create a profile through a series of questions on a restaurant's device 103, tablet, website, or a mobile application. Creating a profile may be incentivized through free or discounted menu items or other motivational tactics.

Return customers will be automatically detected when that customer's mobile device 101 connects to the restaurant's network 102, more specifically the unique identifying number associated with that device is recognized on the restaurant's network 102. Additional information about new or returning customers may be obtained through patron-server conversations, discounts offered to take surveys, data broker databases, or applications operating on the restaurant device 103.

Servers also create profiles as part of the onboarding process or during initialization of the patron-server matching system 100. Server profiles include personal and professional traits including hobbies, food knowledge, and overall customer rating. Restaurants also create profiles which include their location, themes, ambiance type, food selection, and other attributes. These profiles and their attributes are organized in a computational graph where smaller communities surrounding the servers may be identified. This allows patrons and restaurants to fall within the one or more server community boundaries where the most attributes are shared, and recommendations may be made. Recommendations from the profile mapping and recommendation engine 200 improve as more information is gathered about the customers, servers, and restaurants.

Servers and restaurants may also choose to share their profiles on a decentralized (or centralized in one embodiment) database with other participating restaurants and servers allowing for a professional network where work contracts can be negotiated between servers and restaurants.

Figure 2:
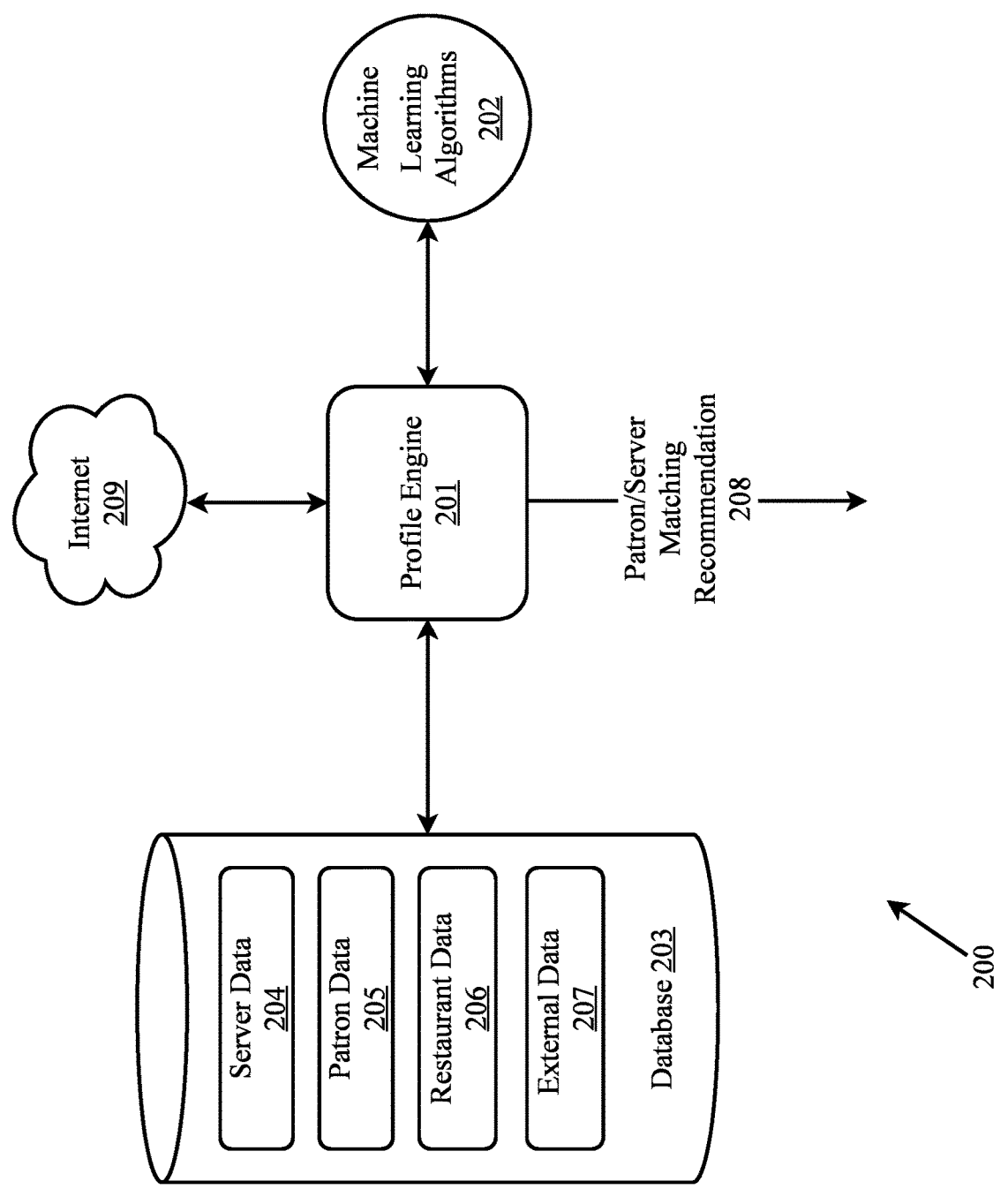
FIG. 2 is a block diagram of an exemplary system diagram for a profile mapping and recommendation engine.

FIG. 2 is a block diagram of an exemplary system diagram for a profile mapping and recommendation engine 200. The primary component is a profile engine 201 that uses machine learning algorithms 202 to provide optimized and ideal matches 208 between patrons and servers. Data rich profiles are stored in a database 203 and comprise server data 204, patron data 205, restaurant data 206, and external factors 207. The data 204, 205, 206, 207 populated within the database 203 may come from any number of sources such as input from a restaurant device 103, webforms, surveys, mobile applications, manual input from servers, and big data (which are extremely large and computationally analyzed data sets).

The profile engine 201 processes the data through one or more algorithms to associate patrons with servers. In some embodiments, the algorithms are machine learning algorithms which may be trained using training datasets labeled with known patterns of successful match characteristics. Subsequent to being trained, the machine learning algorithms may identify other patterns which are also likely to indicate successful matches.

One method of performing matching using machine learning algorithms is to create a directed graph of relationships, and to run graph analysis algorithms to identify associations within the graph, such as the shortest path between a server and patron, or the path with the greatest total edge weights between a server and a patron (with greater edge weights implying more affinity). The main components of the computational graph are entities, attributes, and the relationships between entities and the attributes. Examples of entities include the names of patrons, servers, and restaurants. Attributes include various items such as personality traits, performance metrics, personal information, business operational data, locality data, ratings, and other attributes belonging to patrons, servers, and restaurants. The relationships are links between attributes and/or entities and are weighted based on the amount of commonality shared between entities.

Figure 4:
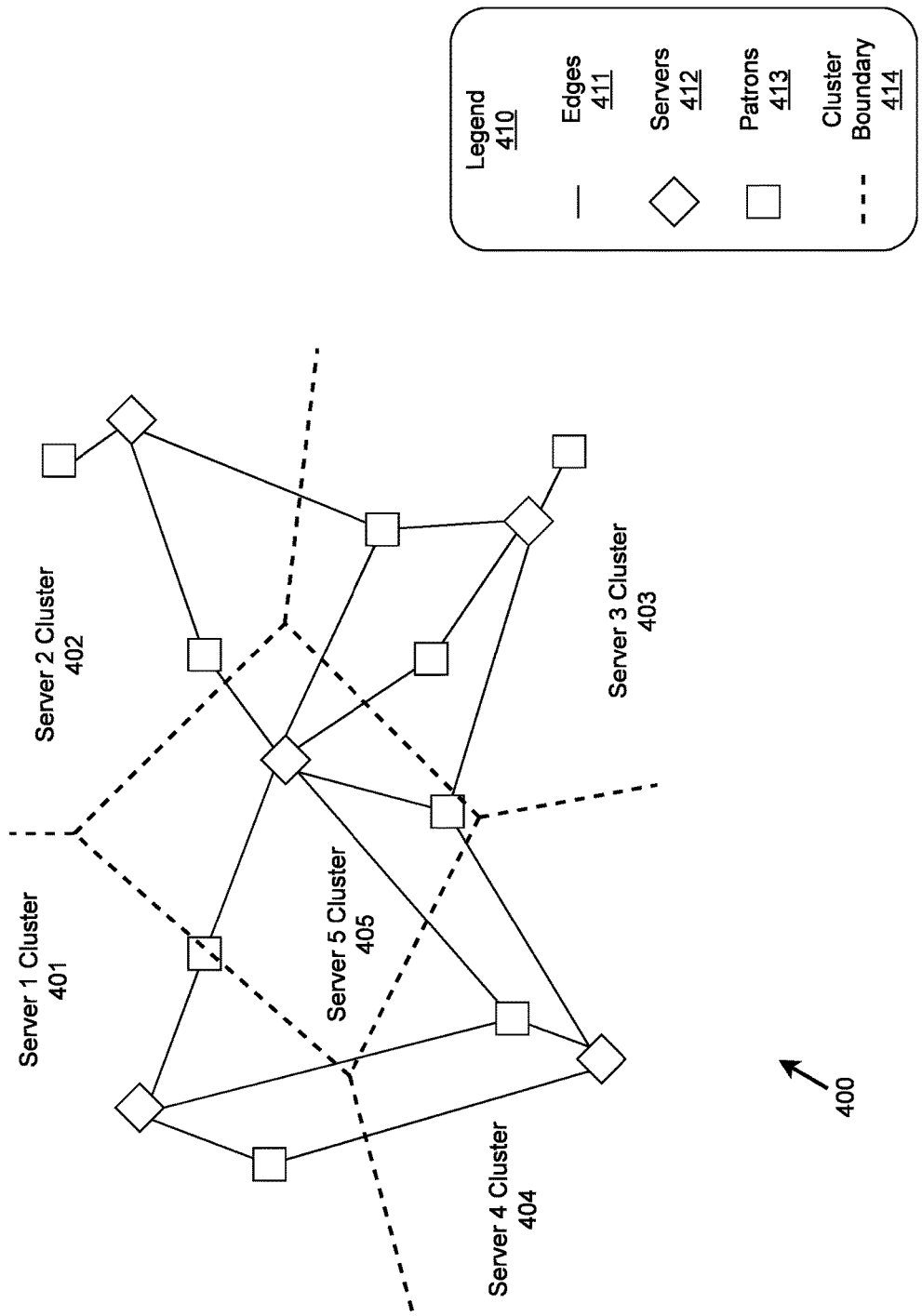
FIG. 4 is a diagram of an exemplary computational graph illustrating the use of cluster analysis for patron-server matchmaking.
Figure 5:
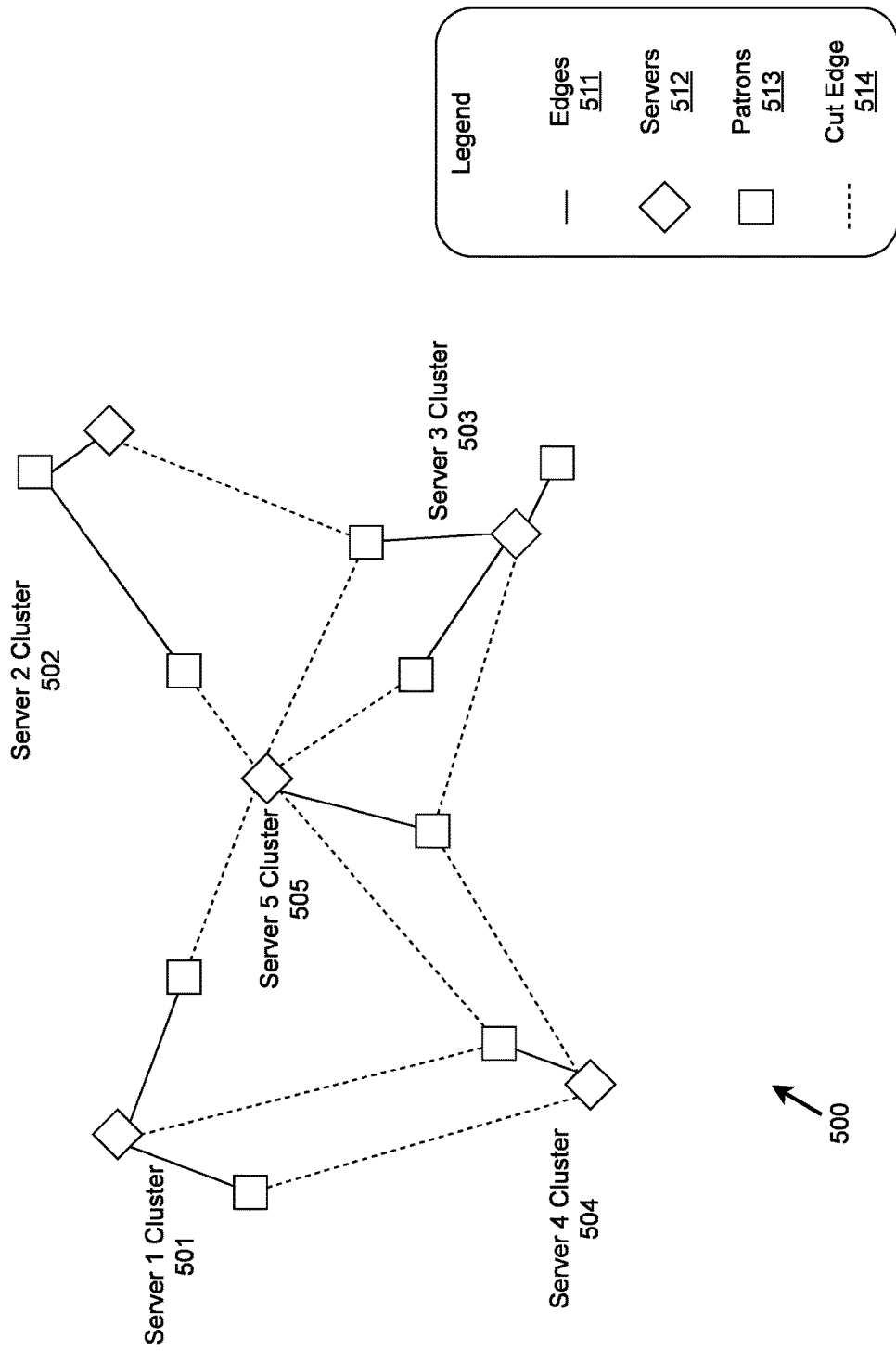
FIG. 5 is a diagram of a portion of a computational graph used for a server-patron matching system.

A detailed description of this process is disclosed in FIG. 4 and FIG. 5.

In one embodiment, the profile engine 201 may reach out to varied Internet 209 sources to request private and public databases for further information about patrons, servers, and restaurants. The internet 209 may also be used to create a decentralized (or centralized) network of profile mapping and recommendation engines 200. This network may serve as a hiring or trading platform for servers and restaurants. Allowing participating restaurants and consenting servers to better form cohesive teams and offer temporary work if one restaurant is understaffed among other scenarios. This cuts down on the hiring process and also allows servers to demand higher salaries should their profile rank higher than average.

Figure 3A:
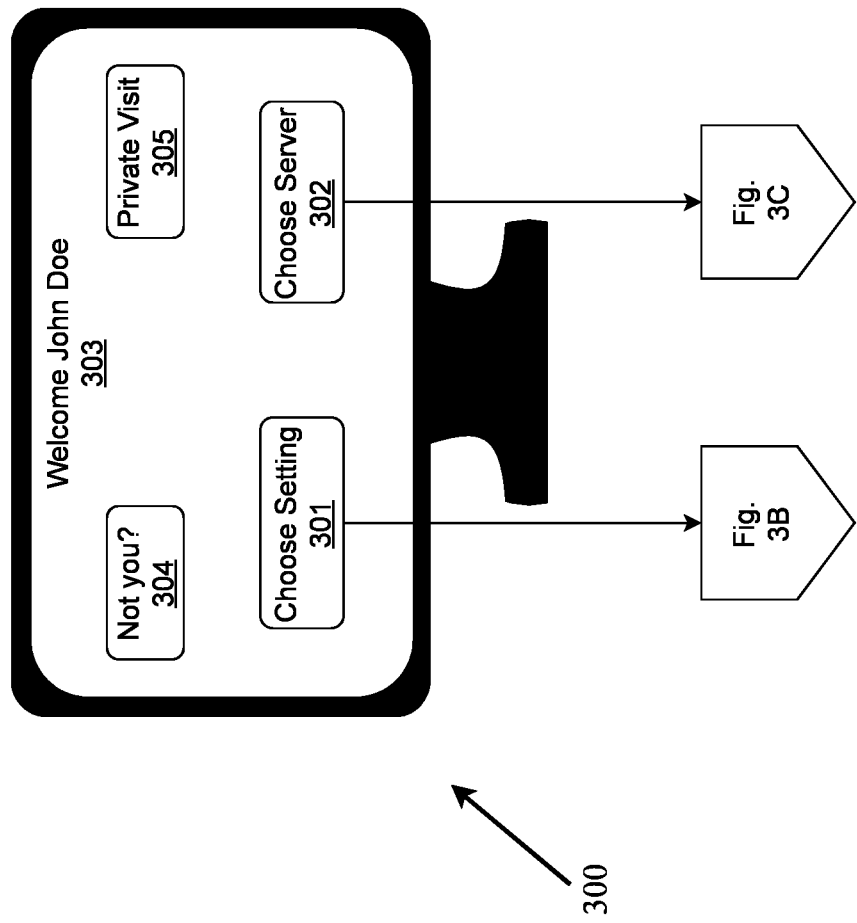
FIG. 3A is a diagram of an exemplary restaurant device for allowing patrons to manually or automatically match with servers.

FIG. 3A is a diagram of an exemplary screenshot 300 of a restaurant device 103 or a customer mobile device 101 for allowing patrons to manually or automatically match with servers. The screenshot 300 shows a display that presents a new or returning patron with a series of options. As described in previously, the customer's mobile device 101 connects to the restaurants network and allows the restaurants device 103 to personalize the customer's experience based on the customer's stored profile. This includes displaying the customer's name 303 and giving him or her the option to change the user 304 in case of an error or in case they are visiting with multiple patrons, all of whom have an account, and lastly the option to dine privately 305 without using the patron-server matching system. In the case where "Not you?" 304 is selected, a request is made to scan the restaurant's network for other returning patrons. "Private Visit" 305 hides that specific customer's mobile device from showing up in scans from other patrons and servers alike.

The option to choose a setting 301 will allow the user to select from a series of subsequent prompts that change their server preferences (and other preferences in some embodiments) based on the context of their visit. The choose server 302 menu option allows the patron to quickly select a server of his choice or allow the system to choose for him.

Figure 3B:
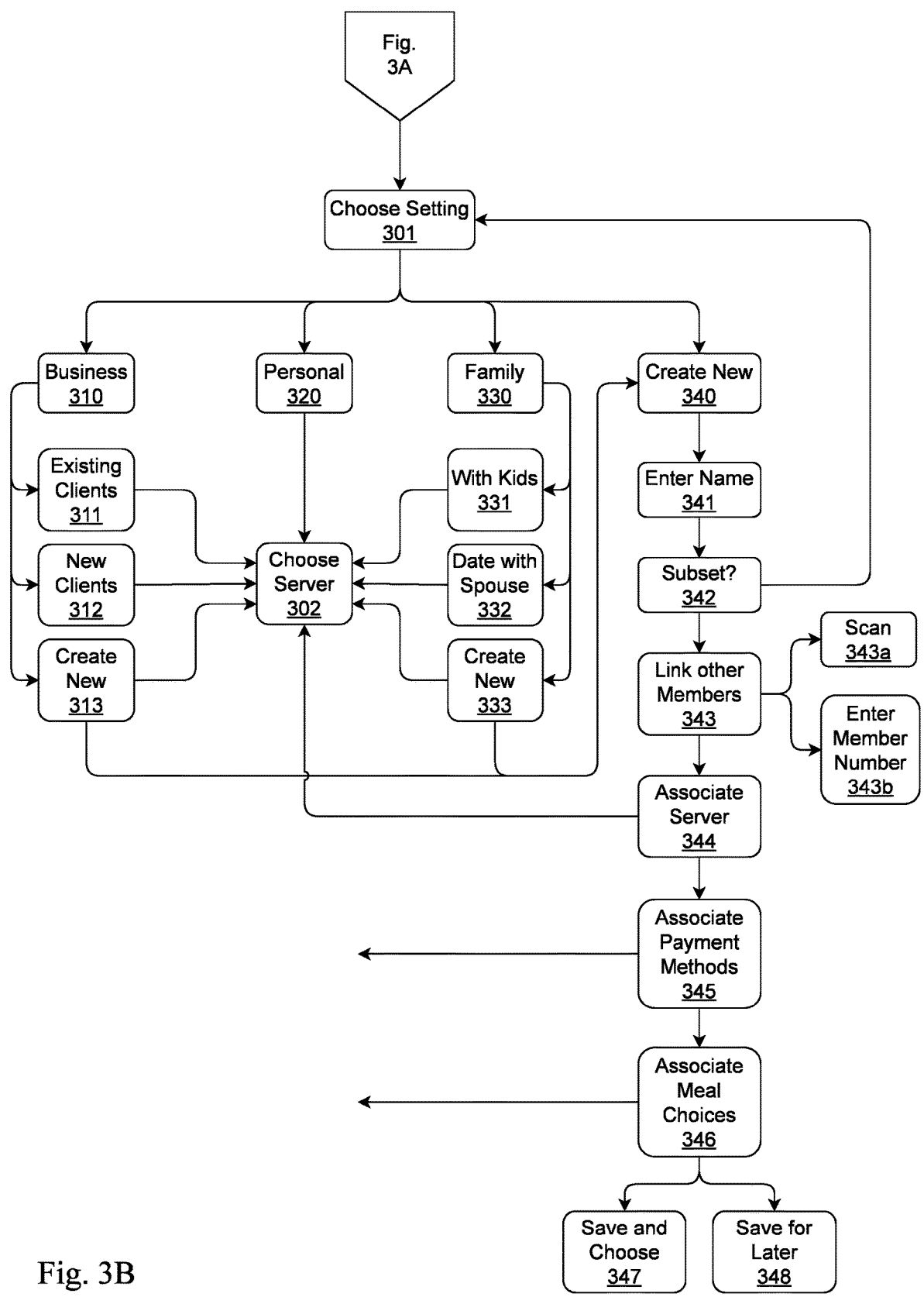
FIG. 3B is a flow diagram illustrating one exemplary method for allowing patrons to choose a server based on the context of their visit on a restaurant device.

FIG. 3B is a flow diagram illustrating one exemplary method for allowing patrons to choose servers based on the context of their visits on a restaurant device 103. When a patron selects choose setting 301 on a restaurant device 300, he or she is presented with at least the option to create a new 340 setting. This is typical for first time patrons but returning patrons may have saved settings such as business 310, personal 320, or family 330. In the scenario where a patron is creating a setting for the first time, the patron will select "Create New" 340. The patron will be prompted to enter a name 341 for the setting, whether the setting is a subset 342 of another setting, which a new user will not have. The patron will also have the ability to link other registered patrons 343 such as a spouse or a business partner. There, the patron will be able to scan patrons currently connected to the restaurant's network 343a or add them by member number 343b. If a patron has already rated servers or if the patron desires a particular server, he or she may do so at the next step "Associate Server" 344. The patron may set up default payment methods 345 and meal choices 346 (and other preferences in some embodiments) and then decide between saving the setting and using it 347 or saving it for later 348.

Should the patron already have saved settings, they may choose one of those. As an example, in this diagram the patron may choose business 310, that has sub settings "Existing Clients" 311 or "New Clients" 312 or they may choose to create a new setting 313. Other choices may include "Family" 330 with sub settings "With Kids" 331, "Date with Spouse" 332, or also "Create New" 333. After a patron has chosen their preferred setting, the next prompt "Choose Server" 302 will allow them to choose a server for that specific setting.

Figure 3C:
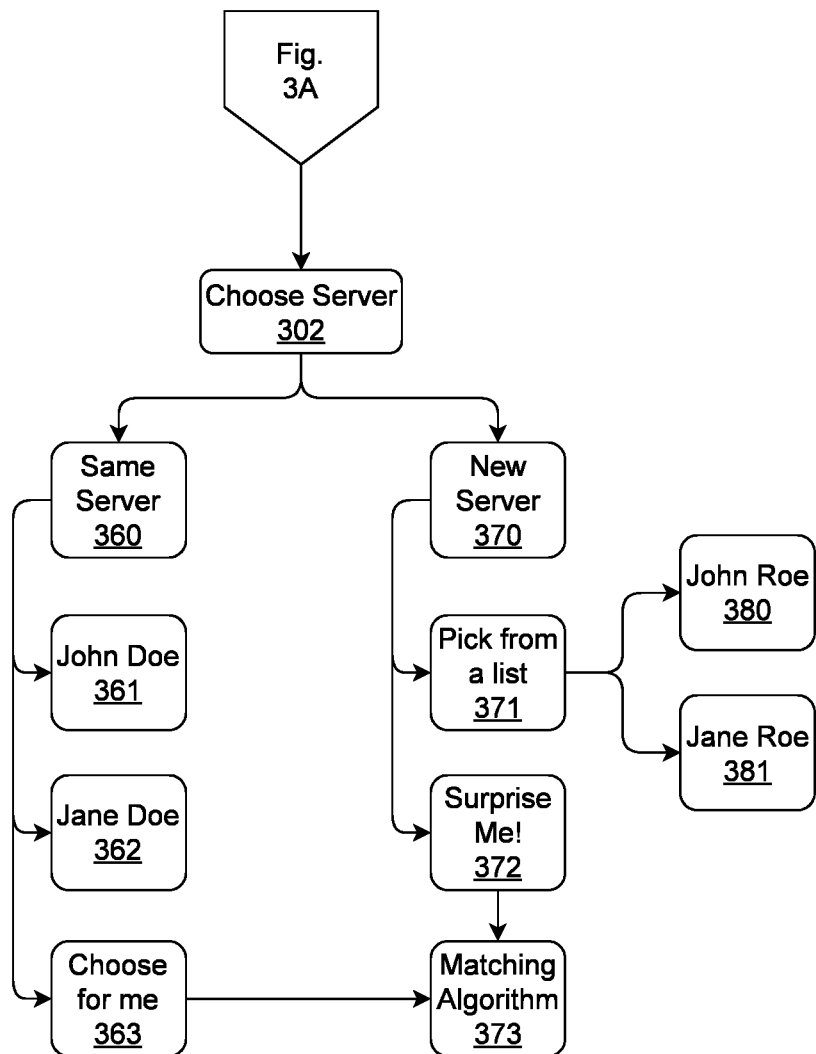
FIG. 3C is a flow diagram illustrating an exemplary method for allowing patrons to choose a server on a restaurant device.

FIG. 3C is a flow diagram illustrating an exemplary method for allowing patrons to choose a server on a restaurant device 103. When a patron selects "Choose Server" 302 either from the main screen as in FIG. 3A or through selecting a setting as in FIG. 3B, the patron will be presented with an option to choose a server they have rated in the past 360 or to select a new server 370. Should the patron choose "Same Server" 360 then a list of already rated servers (John Doe 361 and Jane Doe 362 in this example) will appear along with an option 363 to allow the patron-server matching system 100 to choose for him or her using a matching algorithm 373.

Should "New Server" 370 be selected, options to pick from a list 371 of unrated servers (John Roe 380 and Jane Roe 381 in this example) or to again, choose for the patron (which may be in the form of some colloquial quip to make it fun for the patron) 372 will be available. Should either "Choose for me" 363 or "Surprise Me! 372 be selected, then a recommendation request is made to the profile mapping and recommendation engine 200.

FIG. 4 is a diagram of an exemplary computational graph 400 illustrating the use of cluster analysis for patron-server matchmaking. This diagram of an exemplary graph 400 and legend 410 shows a restaurant's servers 412, patrons 413, and their edges 411 that form five clusters 401, 402, 403, 404, 405 from which a profile mapping and recommendation engine can determine the ideal servers 412 for each patron 413. For example, in this diagram, it can be seen that certain patrons (indicated by squares) are solidly within the cluster of a particular server (indicated by diamonds), indicating a good match between the attributes of the patron and the server. Some patrons fall near the dividing line between servers, indicating that either server would be a good match, but that neither is ideal, as would be the case if the patron was solidly in the server's cluster.

This example is accomplished by a modified use of Google's PageRank algorithm coupled with clustering algorithms to highlight local community structure within the context of a larger network. There are many well-known cluster algorithms including k-means, spectral clustering, Markov cluster algorithms, and many more. However, PageRank is useful because it provides necessary structural relationships between nodes and is especially well-suited for clustering analysis. While PageRank was introduced as a web page graph, PageRank is well defined for any graph.

The main parameter in deriving the graph vectors between nodes is a scaling constant that includes two variance measures which can be used to automatically find the optimized values for this scaling constant in order to determine distances and clusters. The first variance measures discrepancies between the vectors of patron 413 nodes and possible closest server nodes 412 by the probability distribution. The second variance measures large discrepancies between patron 413 nodes and the overall stationary distribution. The vectors determined by this constant use a set of centers of mass (servers 412) to find the cluster boundaries 414 within the graph. Ideal solutions occur when the first variance is small, which indicate the estimates for the upper bounds of a cluster is accurate. When the second variance is large, then the centers of mass are quite far from the stationary distribution, capturing a community structure. The goal of the clustering PageRank algorithm is to find the appropriate scaling constant such that the first variance is small, but the second variance is large thus leading to a series of optimized clusters.

FIG. 5 is a diagram of an exemplary computational graph 500 illustrating the use of betweenness clustering for patron-server matchmaking. Betweenness in the art refers to the shortest path between a node or edge in relation to all other nodes or edges 511. This embodiment starts with a given directive to ensure at least one and no more than one server 512 exists within each cluster 501, 502, 503, 504, 505. The distance of the patron nodes 513 relative to each server node depends on the number of similar attributes shared with each server node. The more attributes a patron node shares with a server node, the closer the patron node is to that particular server node. The betweenness clustering algorithm measures all connected patron 513 and server 512 nodes, and all but the shortest edge is cut 514. This results in five distinct clusters 501, 502, 503, 504, 505 (indicated by solid lines between nodes) from which ideal patron-server matches may be recommended.

Attributes used to form edges comprise personal baseline information such as age, hobbies, cuisine preference, and birthplace. Server baseline metrics include previous customer ratings, cuisine knowledge, and work performance metrics such as number of upsells, table turn time, or server errors per guest. In one embodiment, servers and patrons may link social media accounts that provide that additional personal information and interests. Profiles of servers, patrons, and restaurants may include extraneous information not needed for the graph analysis such as resumes, job listings, menus, and contact information. Games on a restaurant device may be designed to ask the patrons about themselves and store that information in their profile. Customer's emails and phone numbers may be linked to datasets from data brokers and other big data sources.

Another embodiment of this clustered analysis would be to match servers with restaurants where the center of mass of each cluster would change from servers to restaurants, and clusters would be bound by geographical ranges. This embodiment may make use of a web accessibility feature rather than a restaurant device 103, where servers and restaurant managers/owners may use it to negotiate temporary or permanent working contracts.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize several types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 6:
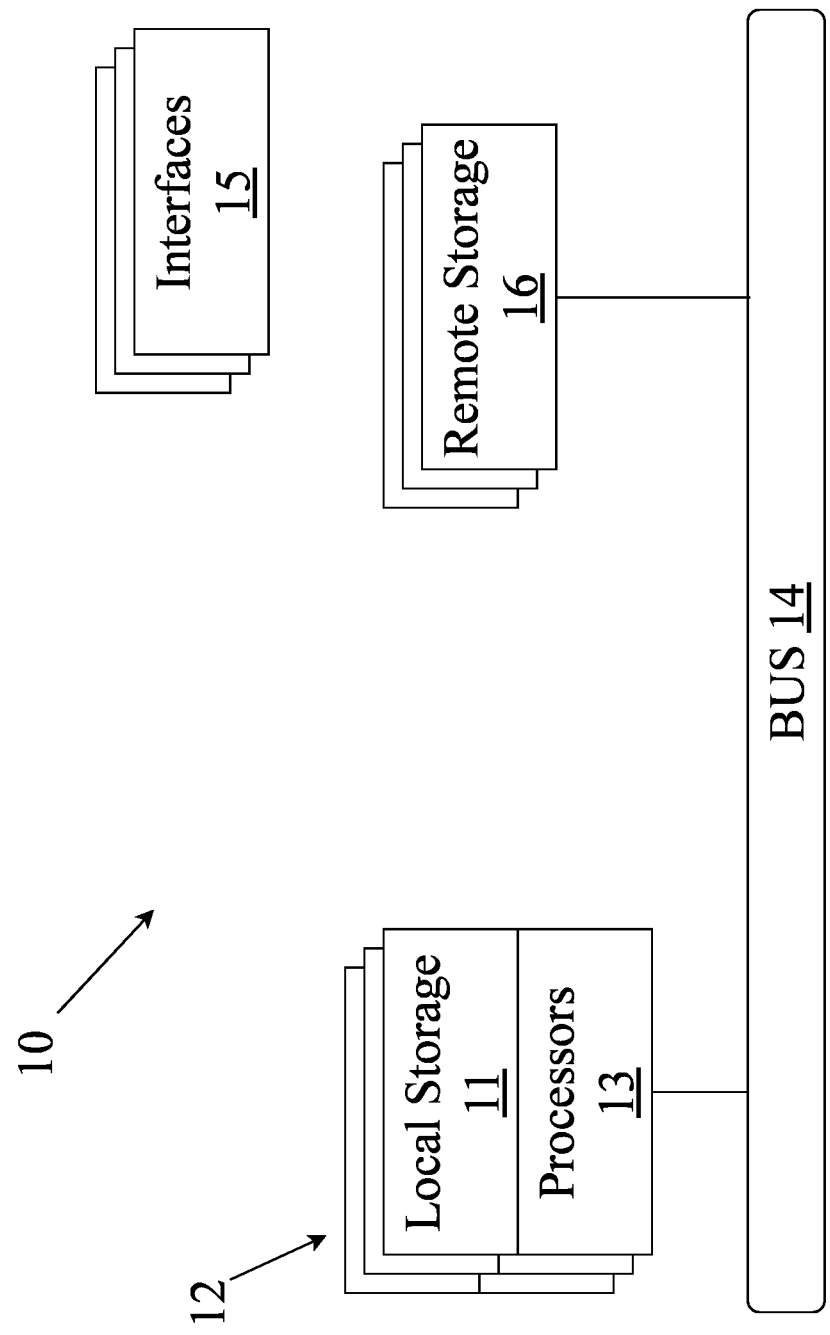
FIG. 6 is a block diagram illustrating an exemplary hardware architecture of a computing device.

Referring now to FIG. 6, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 6 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 7:
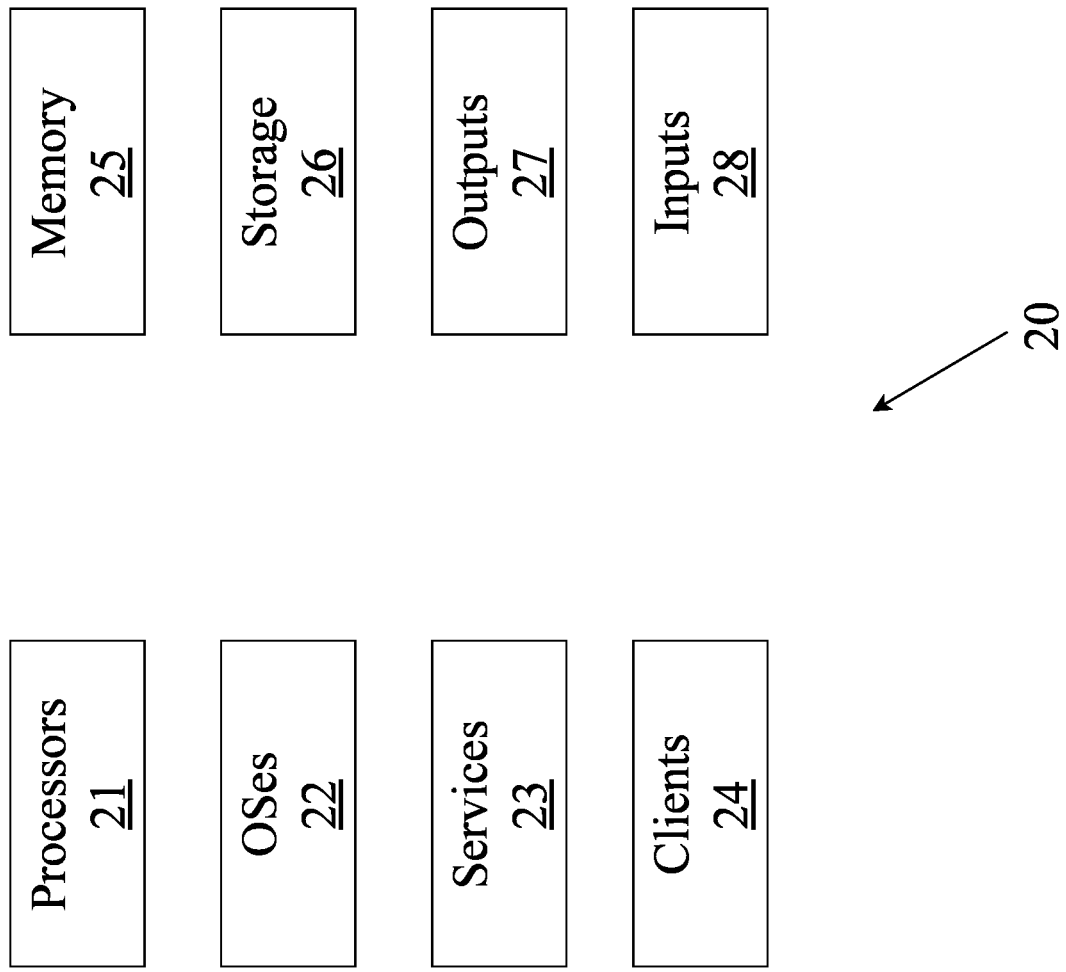
FIG. 7 is a block diagram illustrating an exemplary logical architecture for a client device.

In some aspects, systems may be implemented on a standalone computing system. Referring now to FIG. 7, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 6). Examples of storage devices 26 include flash memory, magnetic hard drive, CD-ROM, and/or the like.

Figure 8:
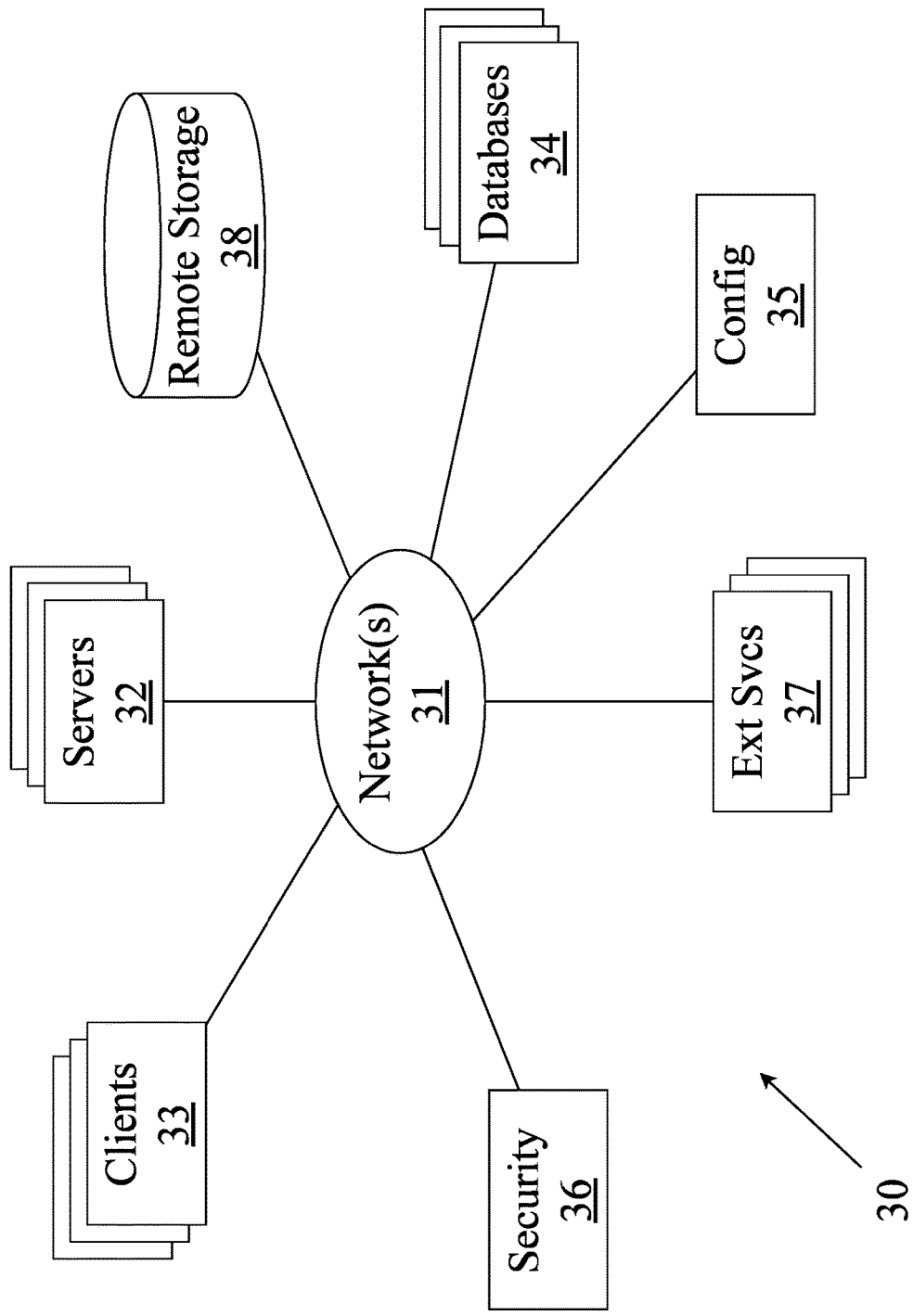
FIG. 8 is a block diagram showing an exemplary architectural arrangement of clients, servers, and external services.

In some aspects, systems may be implemented on a distributed computing network, such as one having any number of clients and/or servers. Referring now to FIG. 8, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 17. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database," it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 9:
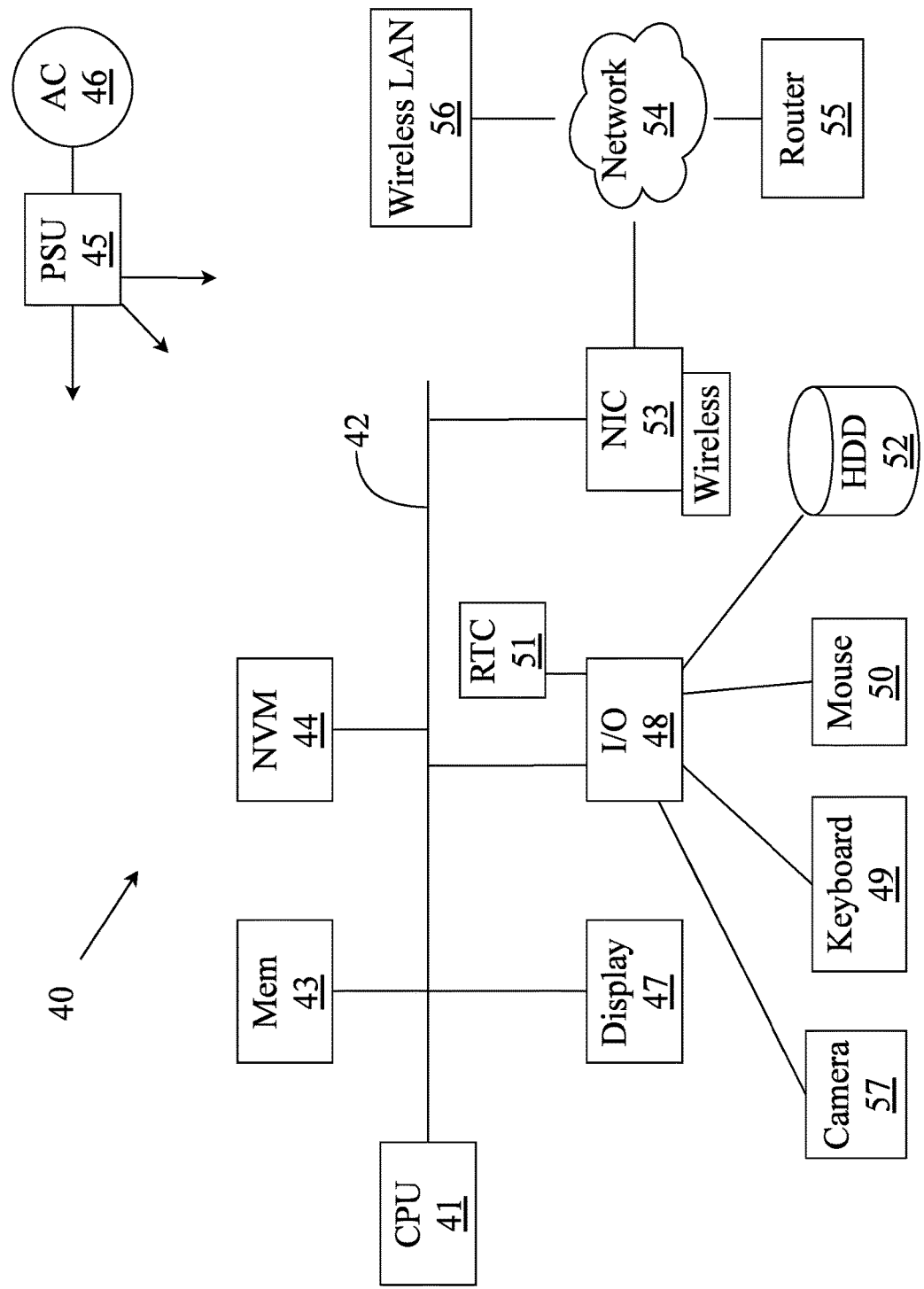
FIG. 9 is another block diagram illustrating an exemplary hardware architecture of a computing device.

FIG. 9 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for matching patrons and servers at restaurants, comprising:
    a computing device comprising a memory, a processor, and a data storage device;
    a database residing in the data storage device, the database comprising profiles of patrons and servers and information about external factors;
    a profile mapping and recommendation engine comprising a plurality of programming instructions stored in the memory, and operating on the processor, wherein the plurality of programming instructions, when operating on the processor, cause the computing device to:
    retrieve a patron's profile from the database;
    retrieve the server profiles from the database;
    retrieve a plurality of external factors from the database;
    map the patron's profile, the server profiles, and the plurality of external factors in a computational graph and use graph analysis algorithms to identify a plurality of servers who are most connected with the patron in the computational graph, wherein patrons are mapped to servers according to the following process:
        patrons are initially mapped to servers according to a first clustering algorithm in which a first variance measures discrepancies between the patrons and servers by probability distribution and a second variance measures discrepancies between the patrons and servers by overall stationary distribution; and
        for patrons matching two or more servers in the first clustering algorithm, those patrons are then mapped to servers according to a second clustering algorithm in which a shortest path between each patron and each server in the computational graph is calculated; and
    match the patron to one of the servers in the plurality of servers based on the mapping and on the plurality of external factors.

2. The system of claim 1, wherein the database further comprises restaurant profiles.

3. The system of claim 2, wherein an individual server's profile and the restaurant profiles are mapped in a computational graph that is used to identify a plurality of restaurants who are most connected with the individual server.

4. The system of claim 3, wherein the individual server is matched with a restaurant from the plurality of restaurants.

5. The system of claim 4, wherein a portion of the information for the patron, server, or restaurant profiles is received from a social media account.

6. The system of claim 1, wherein the patron selects a setting on the mobile device, wherein the setting is the purpose of the patron's visit, and the setting is stored in the patron's profile.

7. A method for matching patrons and servers at restaurants, comprising the steps of:
    retrieving a patron's profile from a database;
    retrieving the server profiles from the database; and
    retrieving a plurality of external factors from the database;
    mapping the patron's profile, the server profiles, and the plurality of external factors in a computational graph and use graph analysis algorithms to identify a plurality of servers who are most connected with the patron in the computational graph, wherein patrons are mapped to servers according to the following process:
        patrons are initially mapped to servers according to a first clustering algorithm in which a first variance measures discrepancies between the patrons and servers by probability distribution and a second variance measures discrepancies between the patrons and servers by overall stationary distribution; and
        for patrons matching two or more servers in the first clustering algorithm, those patrons are then mapped to servers according to a second clustering algorithm in which a shortest path between each patron and each server in the computational graph is calculated; and
    matching the patron to one of the servers in the plurality of servers based on the mapping and on the plurality of external factors.

8. The method of claim 7, wherein the database further comprises restaurant profiles.

9. The method of claim 8, wherein an individual server's profile and the restaurant profiles are mapped in a computational graph that is used to identify a plurality of restaurants who are most connected with the individual server.

10. The method of claim 9, wherein the individual server is matched with a restaurant from the plurality of restaurants.

11. The method of claim 10, wherein a portion of the information for the patron, server, or restaurant profiles is received from a social media account.

12. The method of claim 7, wherein the patron selects a setting on the mobile device, wherein the setting is the purpose of the patron's visit, and the setting is stored in the patron's profile.

* * * * *